(12) United States Patent
Gal et al.

(10) Patent No.: US 7,643,052 B2
(45) Date of Patent: Jan. 5, 2010

(54) SELF-CONTAINED PANORAMIC OR SPHERICAL IMAGING DEVICE

(75) Inventors: Ehud Gal, Reut (IL); Gennadiy Liteyga, Ashkelon (IL); Reuven Eyal, Ramat HaSharon (IL); Itzhak Kattan, Tel Aviv (IL)

(73) Assignee: Wave Group Ltd., Tel-Aviv (IL)

( * ) Notice: Subject to any disclaimer, the term of this patent is extended or adjusted under 35 U.S.C. 154(b) by 992 days.

(21) Appl. No.: 10/495,346
(22) PCT Filed: Nov. 25, 2002
(86) PCT No.: PCT/IL02/00943

§ 371 (c)(1),
(2), (4) Date: Oct. 12, 2004

(87) PCT Pub. No.: WO03/046830

PCT Pub. Date: Jun. 5, 2003

(65) Prior Publication Data

US 2005/0041094 A1 Feb. 24, 2005

(30) Foreign Application Priority Data

Nov. 28, 2001 (IL) .................................. 146802

(51) Int. Cl.
*H04N 7/00* (2006.01)
(52) U.S. Cl. .............................. 348/36; 348/37; 348/39; 348/14.02; 348/14.03; 348/14.05; 348/700; 348/169; 348/699; 348/231.4
(58) Field of Classification Search ................ 348/36, 348/37, 39, 14.02, 14.03, 14.05, 700, 169, 348/699, 231.4
See application file for complete search history.

(56) References Cited

U.S. PATENT DOCUMENTS

| 5,023,725 | A |   | 6/1991 | McCutchen |
| 5,023,922 | A | * | 6/1991 | Abramovitz et al. ........ 382/313 |
| 5,721,585 | A | * | 2/1998 | Keast et al. .................... 348/36 |
| 5,920,337 | A | * | 7/1999 | Glassman et al. .............. 348/36 |
| 5,920,376 | A |   | 7/1999 | Bruckstein et al. |
| 6,028,719 | A |   | 2/2000 | Beckstead et al. |
| 6,130,783 | A |   | 10/2000 | Yagi et al. |
| 6,219,090 | B1 |  | 4/2001 | Nalwa |

(Continued)

FOREIGN PATENT DOCUMENTS

WO 02/059676 8/2002

*Primary Examiner*—Shawn An
(74) *Attorney, Agent, or Firm*—Ladas & Parry LLP

(57) ABSTRACT

The present invention describes a self-contained omni-directional imaging device. The device is designed to contain within it all mechanic, electronic, optic and electro-optic components required for its operation, namely: omni-directional optics, image capture device, power source, illumination sources, transmitters, receivers and additional optional elements for enhanced capabilities. A preferred embodiment of the invention describes such a device housed inside a durable spherical structure, designed for deployment to potentially hazardous environments, enabling omni-directional view to those environments without endangering the viewer. The device is capable of acquiring and transmitting still or video images and audio streams to a remote, control and display unit located near the operator. Among the typical uses for such a device are: security and surveillance, search and rescue operations, anti-terrorism and situation assessment in hostage situations and a variety of civilian and domestic uses, such as remote baby monitoring.

36 Claims, 6 Drawing Sheets

U.S. PATENT DOCUMENTS

| | | | |
|---|---|---|---|
| 6,271,752 B1 * | 8/2001 | Vaios | 340/541 |
| 6,304,285 B1 | 10/2001 | Geng | |
| 6,416,198 B1 * | 7/2002 | Vanderschuit | 362/101 |
| 6,426,701 B1 * | 7/2002 | Levy et al. | 340/573.1 |
| 6,426,774 B1 | 7/2002 | Driscoll, Jr. et al. | |
| 6,831,699 B2 | 12/2004 | Chang et al. | |
| 6,850,282 B1 * | 2/2005 | Makino et al. | 348/371 |
| 2002/0150048 A1 * | 10/2002 | Ha et al. | 370/231 |
| 2005/0179812 A1 | 8/2005 | Chang et al. | |
| 2005/0206729 A1 | 9/2005 | Chang et al. | |

\* cited by examiner

SELF-CONTAINED PANORAMIC OR SPHERICAL IMAGING DEVICE

FIELD OF THE INVENTION

The invention relates to the field of panoramic and spherical imaging. More specifically, the invention describes a design of a robust self-contained panoramic or spherical imaging device.

BACKGROUND OF THE INVENTION

Methods for performing omni-directional imaging in a single shot are known in the art and are based on the use of axi-symmetric reflective surfaces, which reflect an omni-directional scene towards an image capture device. The image that is acquired by the image capture device is however distorted and therefore requires processing in order to be suitable for human viewing. Several such methods have been presented in the art. U.S. Pat. No. 6,028,719, the description of which is incorporated herein by reference, presents a method of acquiring a nearly spherical field of view by using a single axi-symmetric reflective surface with a hole in its center. The surface is directed towards an image capture device, allowing capture of two scenes simultaneously—a panoramic scene and an additional upper sector, both of which together comprise a nearly spherical scene. An improved method for nearly spherical view imaging is provided in published International Patent Application WO 02/069676 by the same applicants hereof, the description of which is incorporated herein by reference. In WO 02/059676 two reflective surfaces with holes in their centers, directed towards each other, coaxially with each other, are used to capture a nearly spherical view. In U.S. Pat. No. 6,426,774 is presented a method of using two reflective surfaces to acquire a panoramic image (cylindrical field of view). All said references are based on the use of axi-symmetric reflective components, which are fabricated separately and combined together after fabrication.

The art has also presented several methods and designs of solid monolithic optical lenses, which allow omni-directional field of view coverage. These designs provide a single molded optical block, which incorporates, from within, all reflective and refractive surfaces required for acquiring the omni-directional image. Further reference to those designs will be made as the description proceeds.

In the reality of the present times there arise many situations which require real time information concerning the activity that is taking place inside dangerous, hazardous, or potentially dangerous or hazardous environments. Typical of such situations are search and rescue operations (especially in confined spaces such as caves, mine disasters, etc.), anti-terrorism activities, and situation assessment in hostage situations. In such situations, it would be extremely advantageous to be able to deploy, from the outside, a portable, self-contained device that could be introduced into these environments and that would be able to automatically orient itself properly and then begin to capture and transmit panoramic or spherical images showing everything that takes place within the environment. Such a device does not exist in the prior art.

It is therefore a purpose of this invention to provide a self-contained panoramic or spherical imaging system.

It is another purpose of this invention to provide a self-contained panoramic or spherical imaging system which comprises an essentially omni-directional lens.

It is yet another purpose of this invention to provide a self-contained panoramic or spherical imaging system which is housed inside a durable essentially spherical structure.

It is a further purpose of this invention to provide a self-contained panoramic or spherical imaging system which can be deployed in potentially hazardous environments, enabling omni-directional viewing of those environments without endangering the viewer.

It is a still further purpose of this invention to provide a self-contained panoramic or spherical imaging system which is capable of acquiring and transmitting still or video images and audio streams to a remote, control and display unit located near the operator.

Further purposes and advantages of this invention will appear as the description proceeds.

SUMMARY OF THE INVENTION

The present invention relates to a robust self-contained panoramic or spherical imaging device, which can be used to collect and transmit panoramic or spherical images of its surroundings and transmit these images to a remote location. Among the typical uses for such a device are: security and surveillance, search and rescue operations, anti-terrorism and situation assessment in hostage situations and a variety of civilian and domestic uses, such as remote baby monitoring. The current invention incorporates methods from several different fields including optics, wireless transmission, electronic assemblies, image processing, shock resistance, and self-stabilization mechanisms.

The methods of omni-directional imaging in a single shot, incorporated into the present invention, are based on the use of axi-symmetric reflective surfaces, which reflect an omni-directional scene towards an image capture device. The single shot image that is acquired by the image capture device is however distorted and requires processing to be made suitable for human viewing.

As discussed hereinabove, several methods of omni-directional imaging in a single shot have been presented in the art. In all of these references, the axi-symmetric reflective components, are fabricated separately and then combined together after fabrication to complete the optical system.

The present invention is directed towards providing a self-contained imaging and relaying device, comprising:

a) a housing provided with positioning means for causing said housing to assume a desired position relative to a reference axis;

b) image-capturing means provided within said housing and positioned such that a desired image is captured when said housing has assumed said desired position;

c) a panoramic lens assembly located within said housing;

d) a power source;

e) a transmitter to transmit the image acquired by said image-capturing means to a remote receiver; and f) optionally, mechanical displacement means to actuate the optical lens assembly as a result of an input received from a remote source or according to a predetermined program.

In the preferred embodiment of the imaging and relaying device of the invention the housing is essentially spherical in shape and the housing is designed to sustain shocks and vibration caused by aggressive deployment. A stabilizer defines the bottom of the housing, wherein deployment of the sphere will cause it to roll and finally pause with its bottom in contact with the surface on which it rolls. In one embodiment the stabilizer comprises a weight, the position of which defines the sphere's bottom side. In another preferred embodiment, a limited outer area of the sphere is flattened, the flattened area determining the sphere's bottom.

In a preferred embodiment of the invention a transparent window is fabricated in the housing. The window is in the field of view of the panoramic optical lens and allows rays from a sector which is in the field of view of the panoramic optical lens, to penetrate the housing and be reflected by the panoramic optical lens onto the image-capturing means. The transparent window is preferably protected by appropriate treatment and coating against scratches and can be essentially the entire housing.

The panoramic optical lens of the imaging and relaying device of the invention can be of many designs including, but not limited to: a "fish-eye" lens, a panoramic optical lens that is modified to allow nearly spherical field of view coverage, a panoramic optical lens that is essentially omni-directional.

In a preferred embodiment, the omni-directional optical lens further comprises a reflective surface located around its central axis of symmetry, which directs an optically zoomed sector towards the image capture device. The reflective surface is positioned so as not to block the omni-directional image reflected by the omni-directional optical lens. The omni-directional optical lens can be a concave axi-symmetric reflective surface. A second reflective surface can be positioned at the concave side of the concave axi-symmetric reflective surface Thus, upon partial rotation of the concave axi-symmetric reflective surface around a vertical axis of rotation, reflection of a limited sector towards the image capture device is allowed. In these embodiments, a motor, connected to the omni-directional optical lens, can be provided, allowing rotation of the omni-directional optical lens in one or more directions.

The imaging and relaying device of the invention can be provided with many optional accessories including a rechargeable power source and illumination sources, which allow illumination of the surrounding of the imaging device. The illumination source is electrically connected to the power source. Further optional accessories include a receiver, an audio transmitter and microphone, and an audio receiver and speaker. The receiver is connected to the power source and to the electronic assembly and is designed to receive operation commands from the exterior of the imaging device and to operate the electronic components as commanded. The audio transmitter and microphone are designed to collect and transmit audio signals from the surroundings of the imaging device to a distant operator. The audio receiver and speaker are designed to broadcast audio signals received from a distance to the surroundings of the imaging device.

In addition, the electronic assembly of the imaging and relaying device of the invention may comprise a motion detection means or a timer. The motion detection means may control the transmitter, allowing only motion detected images to be transmitted. The timer can be used to control the transmission rate, the image acquiring rate, and/or the lighting rate.

The exterior surface of the bottom of the housing may contain a socket or sockets, fabricated and distributed in such a way as to attach and match an external positioning system, such as a tripod. Additionally, the exterior surface of the bottom of the housing may contain a socket or sockets used to connect an external power supply to the power source or for connection of a communication wire to the said transmitter and also a power switch used for activation and deactivation of the imaging device.

The transmitter can enable either transmission over a cable between the device and the operator or wireless transmission.

Another preferred embodiment of the imaging and relaying device of the invention further comprises a detachable upper cover. This embodiment is provided with an elevation mechanism, connected to the image capture device and to the panoramic lens, designed to elevate the image capture device and the panoramic lens through the opening obtained by removing the detachable upper cover. A pre-settable timer can also be provided to trigger detachment of the detachable upper cover and/or operation of the elevation mechanism.

The invention therefore provides an imaging and relaying device comprising:
  a) A housing, the bottom side of which is well defined, such that placement of the housing on its bottom side will cause it to remain still.
  b) An electronics assembly comprising an image capture device directed towards the upper side of the housing and positioned within the housing, above the bottom and in a plane parallel to the plane containing the bottom. The electronics assembly is located such that the center of the image capture device is at the geometric center of the portion of the plane in which it lies that is within the housing.
  c) An omni-directional optical lens, located within the housing, directed towards the image capture device, set to reflect an omni-directional image towards the imaging device. The omni-directional optical lens has a fixed distance from the image capture device while imaging is performed, thus allowing an image of optimal focus to be acquired by the image capture device.
  d) A power source located within the housing and connected to the image capture device.
  e) A transmitter located within the housing and connected to the image capture device and to the power source. The transmitter enabling transmission of the image that is acquired by the image capture device to a location remote from the housing.

Placement of the imaging apparatus on its bottom side causes it to pause on its bottom side, directing the omni-directional optical lens to view an omni-directional scene. The omni-directional scene is reflected towards and acquired by the image capture device and transmitted to a location remote from the housing.

All the above and other characteristics and advantages of the invention will be further understood through the following illustrative and non-limitative description of preferred embodiments thereof, with reference to the appended drawings.

DETAILED DESCRIPTION OF THE PREFERRED EMBODIMENTS

In FIGS. 1 to 4 are schematically shown several optical designs of monolithic omni-directional lenses. The incorporation of those examples in this description is in order to demonstrate the principle of omni-directional lenses and the representative possibilities of their designs. It is to be noted that the purpose of the present invention is not to provide designs of innovative omni-directional lenses, but rather to describe the incorporation of those lenses for the purposes of the present invention, it being understood that the skilled person will be easily able to select the lenses to be employed in a particular device of choice.

Additionally, whenever reference is made herein to "omni-directional", the term should not be taken literally, and it should be understood That it is meant to indicate lens means capable of providing a large field of view, including "fish-eye" and similar types of lenses, e.g., a panoramic field of view, and therefore the term is not limited to any specific type of lens means.

Figure 1:
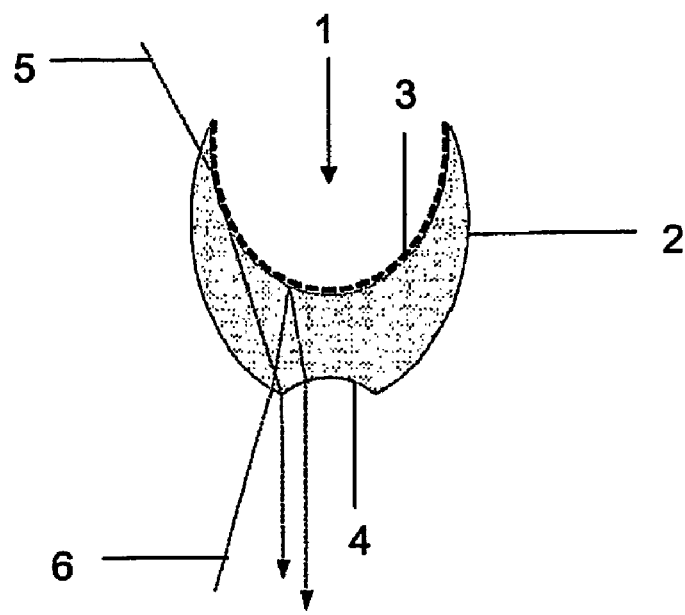
FIG. 1 schematically shows a solid monolithic optical lens which provides coverage of a panoramic field of view.

FIG. 1 is a schematic description of a monolithic optical structure, which provides coverage of a panoramic field of view. The lens (1) has an axi-symmetric aspheric shape, comprising several surfaces having a co-dependent design to compensate aberrations, allowing optimal acquiring of the panoramic image. The lens (1) comprises a perimeter refractive surface (2) an upper transparent surface (3), coated with reflective material on its exterior side, and a lower refractive surface (4). Each ray that is within the vertical field of view covered by the lens (1), is refracted by the perimeter refractive surface (2), penetrates the lens, traveling towards the upper reflective surface (3) where it is reflected downwards towards the lower refractive surface (4), where it is refracted again and exits the lens (1) towards an image capture device (not shown) located coaxially with the lens (1). A first optical path (5) demonstrates a schematic optical path of a ray originating at the upper limit of the field of view which is covered by the lens (1) and a second optical path (6) demonstrates a schematic optical path of a ray originating at the lower limit of that field of view.

Figure 2:
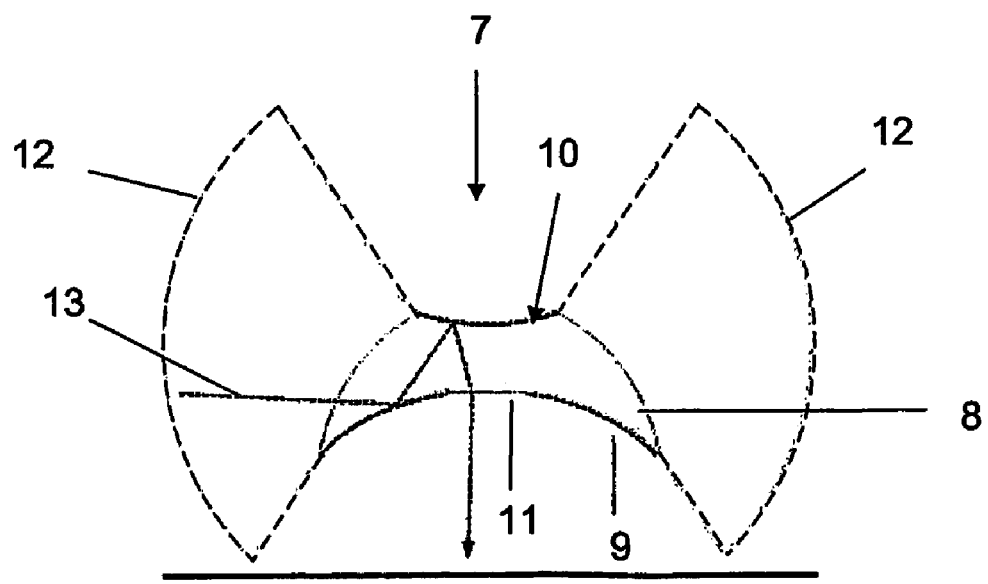
FIG. 2 schematically shows an alternative design for a solid monolithic lens which provides coverage of a panoramic field of view.

FIG. 2 is a schematic description of yet another monolithic optical structure, which provides coverage of a panoramic field of view. The lens (7) has an axi-symmetric aspheric shape, comprising several surfaces having a co-dependent design to compensate aberrations, allowing optimal acquiring of the panoramic image. The lens (7) comprises a perimeter refractive surface (8) a lower transparent surface (9), covered with reflective material on its exterior surface, an upper transparent surface (10) coated with reflective material on its exterior surface, and a lower refractive surface (11). Each ray which is within the vertical field of view (12) which is covered by the lens (7), is refracted by the perimeter refractive surface (8) and travels through the lens towards the lower reflective surface (9) where it is reflected upwards towards the upper reflective surface (10). At the upper reflective surface (10) it is reflected downwards towards the lower refractive surface (11), where it is refracted again and exits lens (7) towards an image capture device (not shown) located coaxially with lens (7). Dashed line (13) represents schematically the optical path of a ray originating within the field of view (12) covered by the lens (7).

Figure 3:
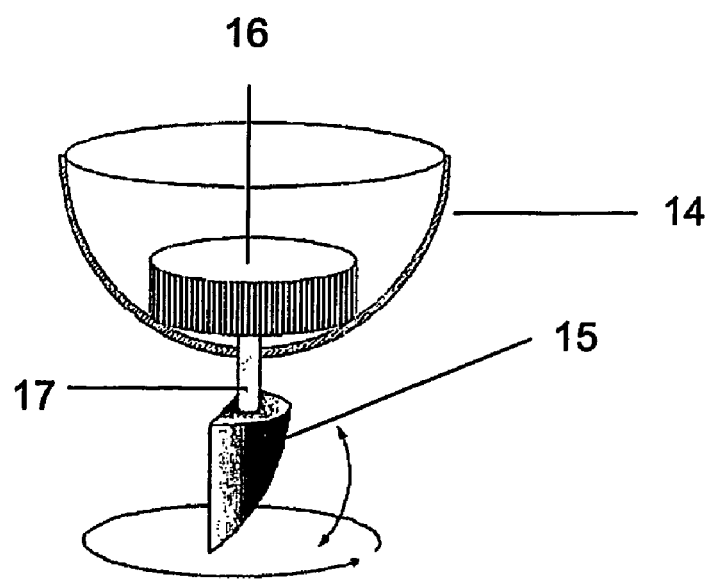
FIG. 3 schematically shows a panoramic lens with an additional optical element which provides simultaneous panoramic coverage together with an optically zoomed sector.

FIG. 3 demonstrates a schematic design of a lens assembly which provides simultaneous coverage of a panoramic field of view together with an optically zoomed sector. The lens assembly comprises an axi-symmetric reflective surface (14), and a second, smaller, reflective surface (16). The axi-symmetric reflective surface (14) is designed to reflect a panoramic field of view towards an image capture device (not shown) located coaxially with it. The second reflective surface (15), which has a different radius of curvature than the axi-symmetric reflective surface (14), is positioned to reflect a limited sector towards the center of the image, thus providing an optically zoomed image of a sector which appears also in the panoramic image, but appears there in smaller proportions. The second reflective surface (15) may be connected directly to the axi-symmetric reflective surface (14), providing a fixed image of a fixed sector or it may be connected to a motor (16), by a connector (17), which enables it to turn and tilt and provide images of different sectors.

Figure 4:
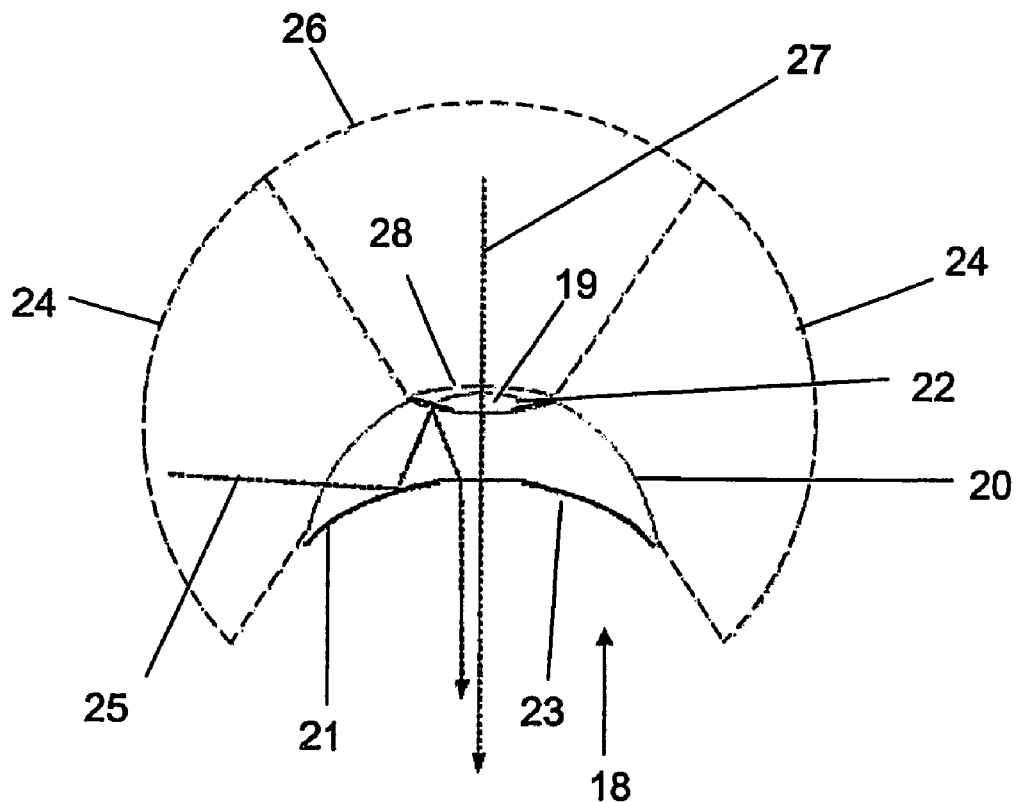
FIG. 4 schematically shows a solid monolithic lens with additional optional optical components, which provides coverage of a nearly spherical field of view.

FIG. 4 demonstrates a design of a monolithic lens which enables coverage of a nearly spherical field of view. The physical structure of the lens (18) is similar to the one demonstrated in reference to FIG. 2. In the present figure, an additional upper refractive surface (19) is incorporated in the lens. The lens (18), therefore, comprises a perimeter refractive surface (20), a lower transparent surface (21), coated with reflective material on its exterior surface, an upper transparent surface (22), coated with reflective material on its exterior surface, a lower refractive surface (23), and the additional upper refractive surface (19). The lens (18) covers a panoramic field of view (24), as demonstrated in FIG. 2. Dashed line (25) represents a schematic optical path of a ray originating in the panoramic field of view (24). The present design, which incorporates an additional upper refractive surface (19), enables light rays located at an additional sector (26) to penetrate the lens, by being refracted by the upper refractive surface (19), then travel through the lens, be refracted by the lower refractive surface (23) and exit the lens. A second dashed line (27) represents a schematic optical path of a ray originating at the additional upper sector (26). Control over the size and properties of the upper sector (26) may be achieved by incorporating additional optical elements (28) above the upper refractive surface (19).

FIGS. 5-10 schematically show some preferred embodiments of the device of the present invention. It is stressed that the device includes many optical, electronic, mechanical, and other components, some of which are considered optional. Therefore, it is clear that numerous embodiments can be devised for the device. The embodiments described do not include all the possible methods of positioning and interconnection of the components, for the sake of brevity, since a skilled person will easily be able to devise alternate designs. To provide an idea of the variety of ways in which the imaging and relaying device of the invention can be assembled, a partial list of some of the components that can be integrated into various embodiments of the invention is given below followed by descriptions of a number of basic implementations of the invention.

The components that can be present in the device include:
a) Omni-directional lens—which may be have various forms, as described hereinabove.
b) An image capture device—directed to acquire the image that is reflected from the omni-directional lens, able to image still or video images.
c) Microphone (optional)—for the collection of sounds that originate in the surroundings of the device.
d) Audio receiver and speaker (optional)—for transmitting audio signals from a remote location to the surroundings of the device.
e) A transmitter (wireless or wired)—designed to transmit still, video and audio streams from the device to the operator's control panel.
f) A receiver (optional)—connected to the power source and the electronics assembly designed to receive commands from the operator and to enable remote control of various functions of the device.
g) Electronics assembly (optional)—comprising appropriate circuitry and command functions to operate the various components, including appropriate controllers and software.
h) A power source (disposable or rechargeable)—designed to supply power to all the power consuming components, such as the image capture device, the transmitter etc.
i) Illumination sources (in various wavelengths) (optional)—may be incorporated to illuminate the surroundings of the device. Infra Red or Near-Infra-Red illumination sources are applicable for cases when exposure of the device is not desired. It is stressed that the image capture device should be such that is sensitive to the illumination wavelength that is implemented, additionally at least part of the wall of the housing must be at least partially transparent to light at the wavelength of the illumination source.
j) Motion detection sensors (which may be acoustic motion detectors, image-processing-based motion detectors or others) (optional)—designed to allow transmission of only motion-detected events and to trigger and control the device functions.
k) A timer (optional)—designed to control some of the operations of the device, such as imaging rate, transmission rate, illumination pulses and control over the elevation mechanism (if such a mechanism is applied).
l) Elevation mechanism (optional)—designed to control the elevation of the imaging assembly.
m) Electro-Mechanical components (optional)—designed to control the elevation mechanism by generating, receiving and transmitting pulses which causes the elevation mechanism to operate (if such a mechanism is applied), or the cover of the device to open (if applicable).
n) Housing—generally of spherical shape in the preferred embodiments. The walls of the housing may be solid or contain openings and may be opaque or be transparent to the light used to record the image, either entirely or in selected segments.
o) Stabilizer—designed to stabilize the device in a desired position, allowing the imaging assembly optimal position and view. The stabilizer may be implemented as a simple weight incorporated in the bottom part of the device, or by any other suitable, and commonly known, method. It should be noted that it is preferable to use other components of the device (such as the power source) as contributors to the weight used to stabilize the device.

Figure 5:
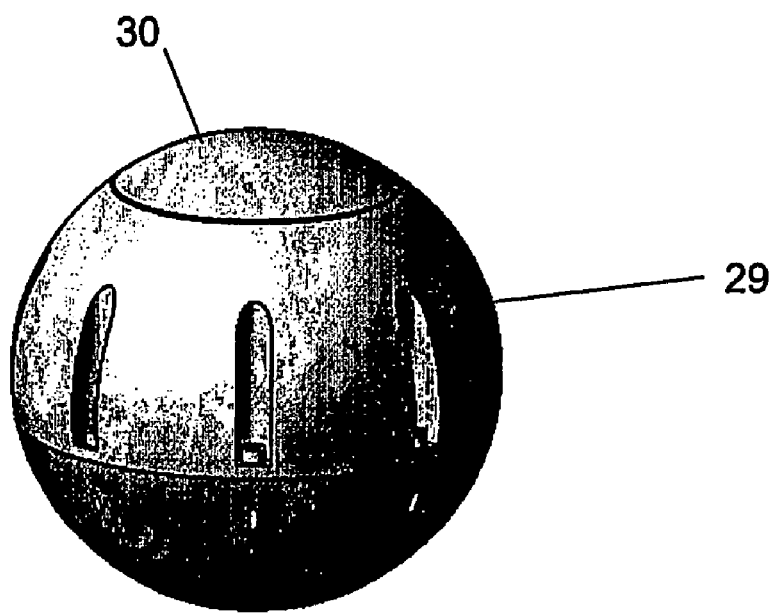
FIG. 5 schematically shows a possible design of the closed structure of the self-contained imaging device, according to a preferred embodiment of the invention.
Figure 6:
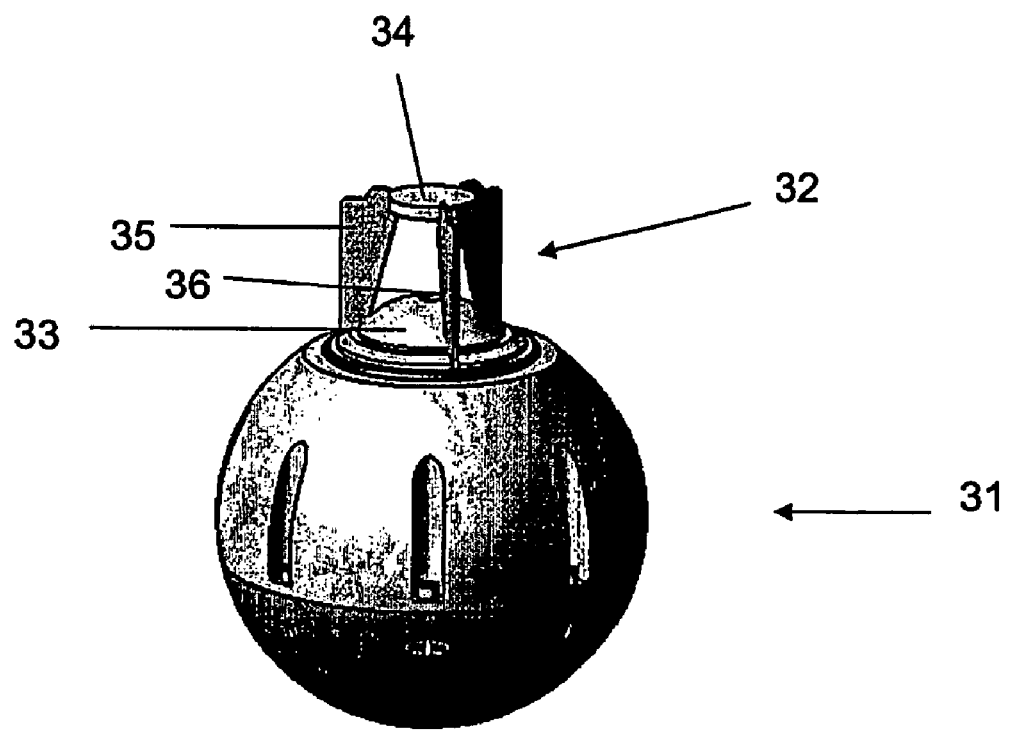
FIG. 6 schematically illustrates the exposure of the optical components from the device in order to enable the capture of an omni-directional field of view, according to a preferred embodiment of the present invention.
Figure 7:
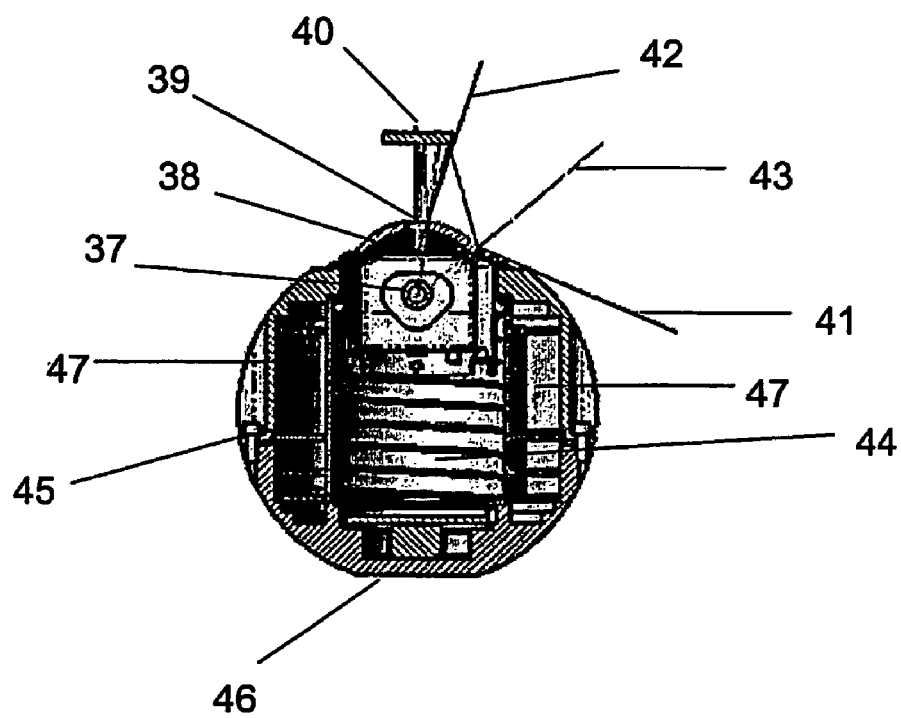
FIG. 7 schematically shows the inner components of the device, according to a preferred embodiment of the present invention.

In FIGS. 5 to 7 is shown a preferred embodiment of the present invention. In this embodiment a sealed opaque housing is used to contain the different components, and an elevation mechanism is used to expose the imaging assemblies, through an opening provided in the housing, to enable imaging.

In this description a portion of the housing of the device is defined as the bottom. The housing and internal components of the device are designed such that the device will always come to rest in a stable position on an essentially horizontal surface. In the stable rest position, the bottom of the device of the invention is in firm contact with the surface on which it rests.

In the preferred orientation of the device, when it is deployed, the principal optical axis of the optical system of the device, which coincides with the symmetry axis of the housing originating at the geometric center of the bottom of the device, is essentially perpendicular to the essentially horizontal surface on which the device rests. The preferred way to assure that the device will assume this orientation is to design the device such that its center of gravity lies on the symmetry axis described hereinabove and is located as closely as possible to the bottom.

FIG. 5 is an external view of the housing of the device of the present invention. According to this embodiment, a spherical structure (29) houses all of the assemblies of the device, including, but not limited to: the optics, the image capture device, the power source, transmitters, receivers, and other electronic assemblies. The housing is fabricated of a durable material such as plastic, metal or other material capable of sustaining shocks and vibrations. Alternatively, it may be made of rubber or other more flexible material that would absorb any shocks, thus protecting the inner components. According to this embodiment, the housing itself is not transparent, thus at least partial elevation of the imaging assembly from the housing is necessary to enable imaging of the surroundings. For this purpose a cover (30) exists in the upper side of the housing. According to a preferred method of operation, the device is placed or thrown into the area in which the observations are to be carried out. After determining that it has stabilized itself for example, by use of an onboard accelerometer and appropriate electronics and software or by use of a timing mechanism or. by a remote control signal, the cover (30) is opened, allowing the imaging assembly to exit and to acquire the omni-directional image.

It is to be noted that methods of designing the device, both externally and internally, to provide shock resistance to both the housing and the inner components, are well known to persons skilled in mechanical design, and therefore no further reference is made herein to methods of shock absorption, vibration resistance etc. It is understood, however, that the methods chosen to provide shock and vibration resistance must be compatible with the desired method of operation of the device as a whole and must allow proper operation of all the inner assemblies of the device In FIG. 6 is shown the housing of FIG. 5 with the imaging assembly elevated from the interior of the housing and in position to record images of the surroundings. As shown in FIG. 6, the device (31) has been stabilized around a specific point at its base and the cover, which previously comprised a part of the upper side of the housing, has been opened (either manually or automatically). The imaging assembly (32) has been elevated through the opening obtained by removal of the cover. According to the embodiment described here, only the omni-directional lens assembly (32) is elevated. Assembly (32) includes a lower convex axi-symmetric reflective surface (33), an upper reflective surface (34) and supports (35). The convex axi-symmetric reflective surface (33) reflects an omni-directional image upwards towards the upper reflective surface (34). The image is then reflected downwards towards an image capture device (not shown) located under the axi-symmetric surface (33). The image passes through a hole (36) located at the center of the convex axi-symmetric surface (33) and then is acquired by the image capture device. The supports (35) are designed to maintain an optimal, fixed distance between the convex axi-symmetric reflective surface (33) and the upper reflective surface (34) thus enabling optimal focus by the image capture device on the reflected image. The omni-directional lens assembly (32) described here, may be replaced by any other omni-directional lens, as long as it is positioned in such a relation with the surroundings and the image capture device that it enables acquiring the omni-directional image.

FIG. 7 is a cross section of the embodiment of the device shown in FIG. 6, showing some of its internal components. In this figure, the image capture device (37) is located under the axi-symmetric convex reflective surface (38), directed towards the hole (39), which is located at the center of the convex reflective surface (38), to enable capture of the image that is reflected by the upper reflective surface (40). A first solid line (41) symbolizes the lower limit of the panoramic field of view which is covered by the imaging assembly, and a second solid line (42) symbolizes the upper limit. A dashed line (43) represents a schematic optical path of a light ray originating in the panoramic field of view. This optical path (43) may change depending on the lens layout that is implemented.

An elevation mechanism (44) is located under the image capture device (37), designed to elevate the entire imaging assembly, elevating it from the housing, to enable acquiring an image of the surroundings of the device. The implementation and operation of the elevation mechanism (44) may be by use of numerous methods. For example, the elevation mechanism (44) may be a simple spring which pushes the imaging assembly upwards when the cover is removed, or it may be another type of mechanism triggered by an electronic pulse which is generated by the remote operator or by the device itself.

As shown in FIG. 7, the housing (45) may be fabricated as an "incomplete" sphere, meaning one of the areas of the sphere (46) is trimmed, thus defining the "bottom" of the housing. Proper care in locating the center of gravity of the sphere will cause the device to always position itself with the bottom side down. The device also contains internal power sources (47) and additional electronic connectors and components that may control various function of the device.

Figure 8:
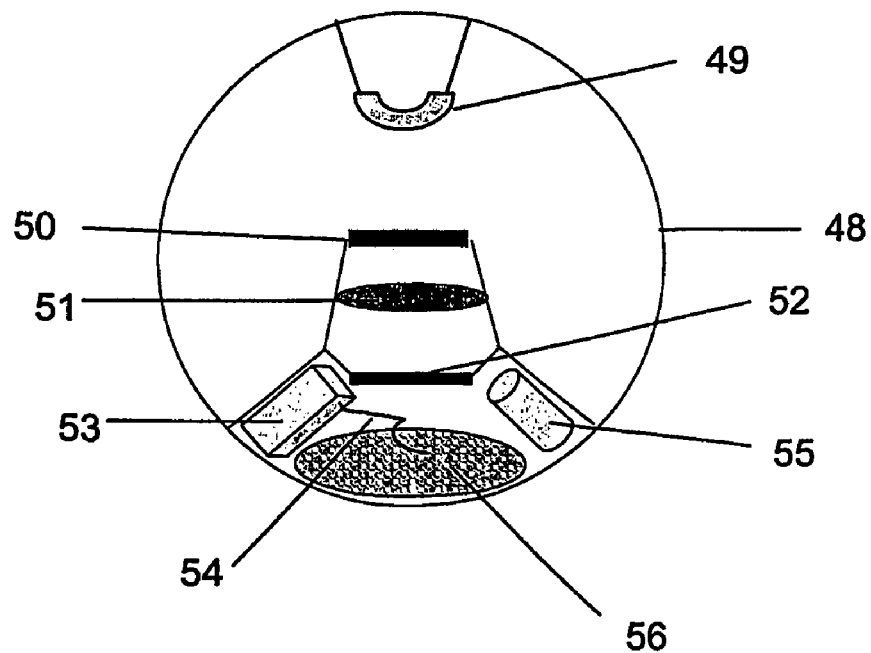
FIG. 8 schematically shows the device, according to another preferred embodiment of the present invention.
Figure 9:
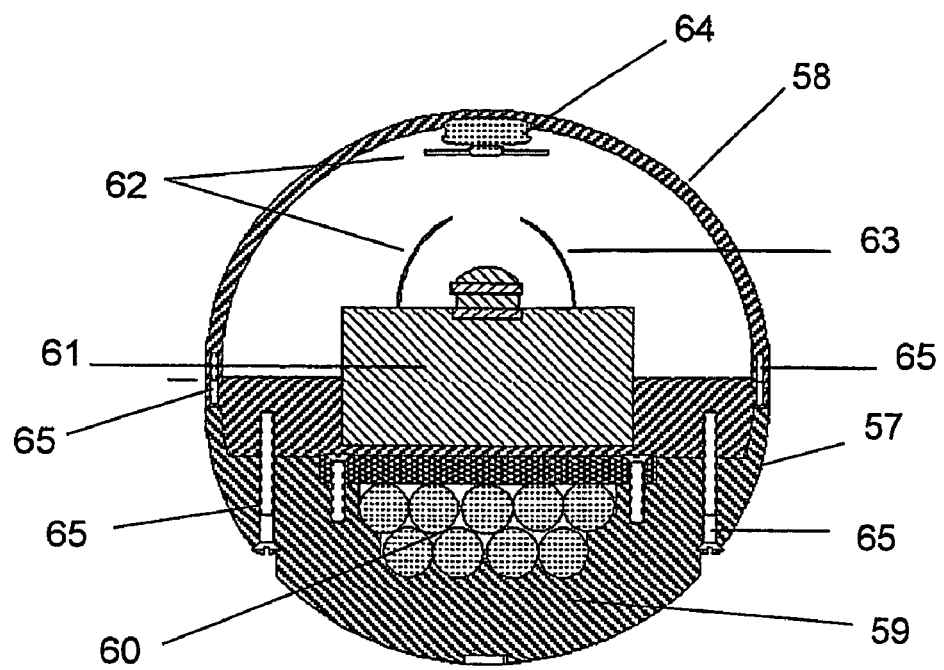
FIG. 9 schematically shows the device, according to yet another preferred embodiment of the present invention.

FIGS. 8-9 demonstrate another preferred embodiment of the present invention, wherein an at least partially transparent housing is used to enable imaging of the surroundings from inside the device.

Referring to FIG. 8, all of the components of the device are located within a sealed housing (48), which is at least partially transparent. The device comprises an axi-symmetric concave reflective surface (49) fastened to the inner upper side of the housing (48), directed towards image capture components, which may be implemented as a commercial camera or as separate components—a lens (51), an optical filter (50) and a focal plane array (52). The device further comprises a transmitter (53) with an antenna (54), a power source (55) which supports the operation of the other components, and a weight (56) designed to define the bottom of the device and to stabilize its position allowing the imaging components to acquire an image of the desired region. It is to be noted that, although this figure describes the simplest design, additional components, as described hereinabove, may be incorporated to allow enhanced operation. It is further to be noted that the housing (48) must be at least partially transparent to allow the reflective surface (49) to receive rays from the panoramic surroundings and direct them freely towards the imaging components located within the device. The reflective component (49) as shown in this figure, may be a reflective concave element connected, or simply glued to the upper inner side of the housing (48), or it may be fabricated as a depressed area within a transparent dome, where the reflective material coats its concave (exterior) surface.

In FIG. 9 is shown another preferred embodiment of the device of the invention. In this figure, an omni-directional lens, which provides a nearly spherical field of view, is employed. The device is comprised of a housing consisting of a lower half (57), made of suitable material, for example, one of the opaque materials suitable for use in the first preferred embodiment of the invention as described hereinabove, and an upper half (58) which is a transparent dome. Inside the lower half of the housing is located a weight (59), which stabilizes the device. Also within the shell are located power sources (60), which supply power to the power-consuming components, an imaging capture device (61) equipped with all additional electronics (transmitters etc.) and a lens assembly (62) similar to the one described in above cited publication WO 02/059676, which enables coverage of an essentially spherical field of view. The lens assembly (62) comprises two main components—a lower axi-symmetric convex reflective surface (63) and an upper reflective surface (64), which is fastened to the inner upper side of the housing (58). For the sake of brevity no additional description is provided herein to this specific lens assembly (62), since its layout and characteristics are described in the abovementioned publication. The two halves of the device are assembled separately and connected together with screws (65) distributed evenly in order not to displace the center of mass of the device.

Figure 10:
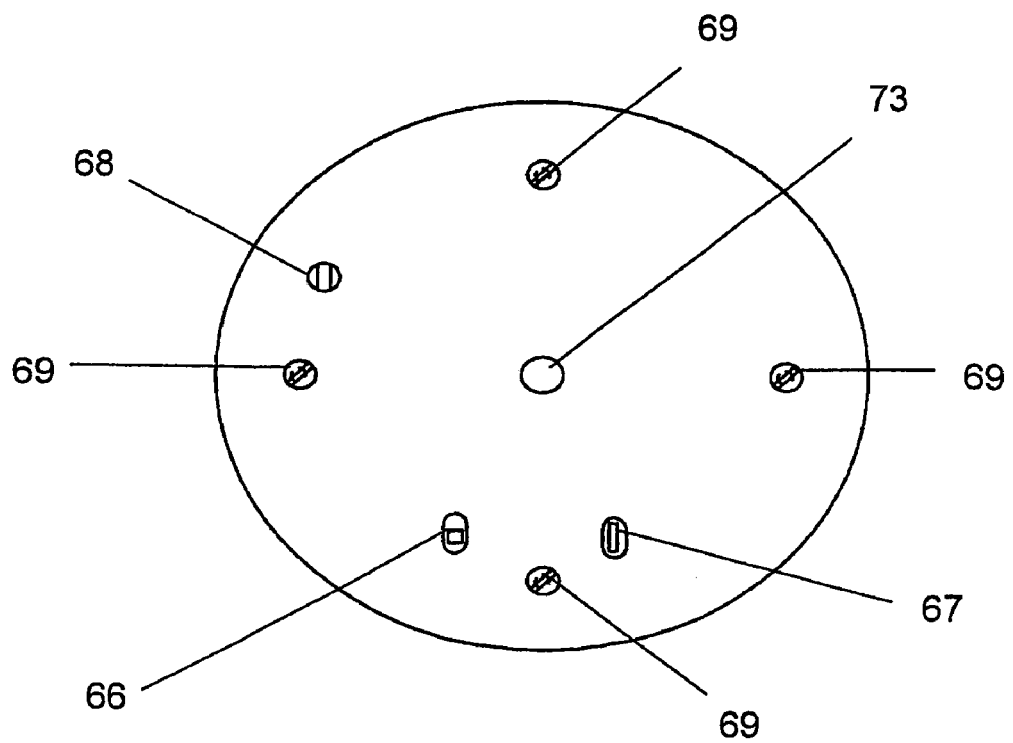
FIG. 10 is a schematic representation of the exterior of the bottom side of the device, demonstrating some of its possible connectors.

FIG. 10 schematically shows the bottom side of the device. The bottom side contains connectors to external equipment to enhance the device's operation. It is to be noted that some of these connectors are optional, additional connectors may be added, and all of them may be implemented in numerous ways. Examples of possible connectors and external equipment that can be employed to operate the device of the invention are: on/off switch (66) for controlling the activation and deactivation of the device; connector (67,) for wired transmission of the data that is acquired by the device; power connector (68), for recharging the device and operating it directly from an external power source; and a socket, (73) for attaching the housing to an external positioning system such as a tripod. Screws (69), for attaching the various components to the housing, may also be located on the bottom side.

Figure 11A:
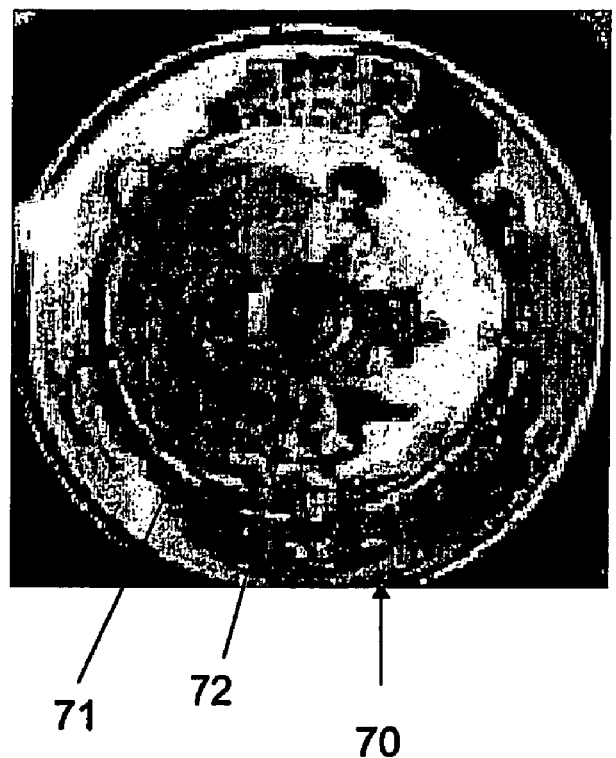
FIG. 11A shows the shape of the image as reflected from the omni-directional optical assemblies.

In FIG. 11A is shown the image shape that is acquired by reflective omni-directional lenses. A circular image (70) is acquired by the image capture device. This image shape is determined by the shape of the reflection that arrives from the lens. The image comprises an outer area (71) and an inner area (72). The outer area (71) comprises the panoramic view as acquired by the lens, and the inner area (72) comprises the reflection of the image capture device itself.

The image shape shown in FIG. 11A is typical for optical structures such as those shown in FIGS. 1, 2, 6, and 8, which acquire a panoramic field of view. Optical structures which enable a nearly spherical field of view, such as the ones shown in FIGS. 4 and 9 utilize the inner area (72) to image the upper sector, which becomes an additional sector in the panoramic view. Optical structures, such as those that are illustrated in FIG. 3, manipulate the inner area (72) to view the optically zoomed sector.

Figure 11B:
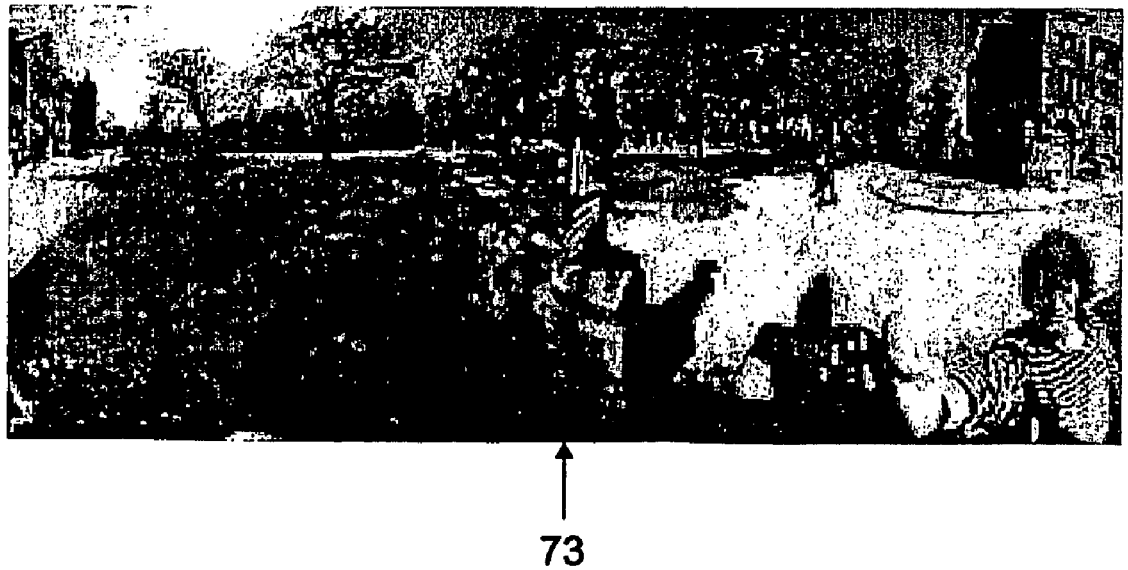
FIG. 11B shows a suitable transformation of the image of FIG. 11A.

In all cases, the panoramic view, as it appears in the outer area (71) of FIG. 11A, is not suitable for viewing and it is usually processed to be presented as the rectangular image (73) shown in FIG. 11B. Methods of transforming the circular image shown in FIG. 11A into the rectangular image shown in FIG. 11B are well known in the art and therefore will not be further described herein.

Although embodiments of the invention have been described by way of illustration, it will be understood that the invention may be carried out with many variations, modifications, and adaptations, without departing from its spirit or exceeding the scope of the claims.

The invention claimed is:

1. A self-contained imaging and relaying device comprising:
   a) housing provided with positioning means for causing said housing to assume a desired position relative to a reference axis;
   b) image-capturing means provided within said housing and positioned such that a desired image is captured when said housing has assumed said desired position;
   c) a panoramic lens assembly located within said housing;
   d) a power source;
   e) a transmitter to transmit the image acquired by said image-capturing means to a remote receiver; and
   f) optionally, mechanical displacement means to actuate the optical lens assembly as a result of an input received from a remote source or according to a predetermined program; and
   g) a stabilizer defining the bottom of the housing, wherein deployment of the sphere will cause it to roll and finally pause with its bottom in contact with the surface on which it rolled,
   wherein the housing is essentially spherical in shape.

2. An imaging and relaying device according to claim 1, wherein said stabilizer comprises a weight, the position of which defines said sphere's bottom side.

3. An imaging and relaying device according to claim 1, wherein a limited outer area of the sphere is flattened, said area determining said sphere's bottom.

4. An imaging and relaying device according to claim 1, wherein the housing is designed to sustain shocks and vibration caused by aggressive deployment.

5. An imaging and relaying device according to claim 1, wherein a transparent window is fabricated in the housing, said window being in the field of view of the panoramic optical lens, allowing rays from a sector which is in the field of view of said panoramic optical lens, to penetrate said housing and be reflected by said panoramic optical lens onto the image-capturing means.

6. An imaging and relaying device according to claim 5, wherein the transparent window is essentially the entire housing.

7. An imaging and relaying device according to claim 5, wherein the transparent window is protected by appropriate treatment and coating against scratches.

8. An imaging and relaying device according to claim 1, wherein the panoramic optical lens is a "fish-eye" lens.

9. An imaging and relaying device according to claim 1, wherein the panoramic optical lens is modified to allow nearly spherical field of view coverage.

10. An imaging and relaying device according to claim 1, wherein the panoramic optical lens is essentially omni-directional.

11. An imaging and relaying device according to claim 10, wherein the omni-directional optical lens further comprises a reflective surface located around its central axis of symmetry, directing an optically zoomed sector towards the image capture device, said reflective surface being positioned so as not to block the omni-directional image reflected by said omni-directional optical lens.

12. An imaging and relaying device according to claim 11, further comprising a motor, connected to the omni-directional optical lens, allowing rotation of said omni-directional optical lens in one or more directions.

13. An imaging and relaying device according to claim 10, wherein the omni-directional optical lens is a concave axi-symmetric reflective surface.

14. An imaging and relaying device according to claim 10, wherein a second reflective surface is positioned at the concave side of the concave axi-symmetric reflective surface, allowing reflection of a limited sector towards the image capture device, upon partial rotation of said concave axi-symmetric reflective surface around a vertical axis of rotation.

15. An imaging and relaying device according to claim 1, wherein the power source is rechargeable.

16. An imaging and relaying device according to claim 1, further comprising illumination sources, allowing illumination of the surrounding of said imaging device, said illumination sources being electrically connected to the power source.

17. An imaging and relaying device according to claim 1, further comprising a receiver, connected to the power source and to the electronic assembly, designed to receive operation commands from the exterior of the said imaging device and to operate the electronic components as commanded.

18. An imaging and relaying device according to claim 1, further comprising an audio transmitter and microphone, designed to collect and transmit audio signals from the surroundings of said imaging device to a distant operator.

19. An imaging and relaying device according to claim 1, further comprising an audio receiver and speaker, designed to broadcast audio signals received from a distance to the surroundings of said imaging device.

20. An imaging and relaying device according to claim 1, further comprising a socket or sockets at the bottom of the housing, fabricated and distributed in such a way as to attach and match an external positioning system.

21. An imaging and relaying device according to claim 1, further comprising a socket at the bottom of the housing, used to connect an external power supply to the power source.

22. An imaging and relaying device according claim 1, wherein the electronic assembly further comprises motion detection means.

23. An imaging and relaying device according to claim 22, wherein the motion detection means control the transmitter, to allow only motion detected images to be transmitted.

24. An imaging and relaying device according to claim 1, further comprising a timer.

25. An imaging and relaying device according to claim 24, wherein the timer controls the transmission rate.

26. An imaging and relaying device according to claim 24, wherein the timer controls the image acquiring rate.

27. An imaging and relaying device according to claim 24, wherein the timer controls the lighting rate.

28. An imaging and relaying device according to claim 1, further comprising a power switch, located at the exterior of the housing, used for activation and deactivation of the said imaging device.

29. An imaging and relaying device according to claim 1, wherein the transmitter enables transmission over a cable between the device and the operator.

30. An imaging and relaying device according to claim 1, wherein the transmitter enables wireless transmission.

31. An imaging and relaying device according to claim 1, further comprising a socket located at the exterior of the housing, and used for connection of a communication wire to the transmitter.

32. An imaging and relaying device according to claim 1, further comprising a detachable upper cover.

33. An imaging and relaying device according to claim 32, further comprising an elevation mechanism, connected to the image capture device and to the panoramic lens, designed to elevate said image capture device and said panoramic lens through the opening obtained by removing the detachable upper cover.

34. An imaging and relaying device according to claim 33, further comprising a pre-settable timer.

35. An imaging and relaying device according to claim 34, wherein the pre-settable timer triggers detachment of the detachable upper cover.

36. An imaging and relaying device according to claim 34, wherein the pre-settable timer triggers operation of the elevation mechanism.

* * * * *